United States Patent [19]
Fishman et al.

[11] Patent Number: 5,991,060
[45] Date of Patent: Nov. 23, 1999

[54] AUTOMATIC POWER CONTROL FOR A WAVELENGTH SELECTIVE EML MODULE

[75] Inventors: Daniel A. Fishman, Lakewood; Thomas Lawson Koch, Holmdel; Uziel Koren, Fair Haven, all of N.J.

[73] Assignee: Lucent Technologies Inc., Murray Hill, N.J.

[21] Appl. No.: 08/899,854

[22] Filed: Jul. 24, 1997

[51] Int. Cl.⁶ .................................................. H04B 10/04
[52] U.S. Cl. .......................................... 359/187; 359/110
[58] Field of Search ...................................... 359/110, 187, 359/160, 173; 372/26, 29

[56] References Cited

U.S. PATENT DOCUMENTS 5,325,225  6/1994  Suzaki et al .............................. 359/187
5,706,117  1/1998  Imai et al. ............................... 359/187

*Primary Examiner*—Kinfe-Michael Negash

[57] ABSTRACT

The invention is directed to an optical transmission system employing an electro-absorption modulator operative that absorbs energy from light received from a source of light and modulates the received light with information signals received from a source of information and outputs the modulated light signal to an optical transmission line, and employing apparatus that controls the level of light signals provided by the source as a function of a control signal having a level proportional to the level of the absorbed energy.

13 Claims, 1 Drawing Sheet

AUTOMATIC POWER CONTROL FOR A WAVELENGTH SELECTIVE EML MODULE

FIELD OF THE INVENTION

The invention relates to optical transmission systems.

BACKGROUND OF THE INVENTION

The output power of a DFB laser is typically stabilized by setting the laser bias current to a reference point that corresponds to the laser "backfacet" current. The backfacet current may be derived by coupling photodiode to the backfacet light. This scheme is adequate only if there is a strong correlation between the backfacet light and forward light that is coupled into the fiber optic cable. In photonic-integrated circuits (PICS), the laser may be coupled to other optical devices, for example, a Semiconductor Optical Amplifier (SOA), Electro-Absorptive Modulator (EAM), etc., which potentially reduces the correlation between the laser back facet power and the power that the laser outputs to a coupled fiber.

SUMMARY OF THE INVENTION

We deal with this problem in a wavelength selectable laser (WSL) employing a SOA and EAM by detecting and controlling the WSL output power using the photoabsorptive current in the EAM and the correlation between the EA current and the optical power incident on the EAM.

More specifically, the EAM modulates continuous wavelength (CW) light that it receives from a source of light, in which particular apparatus controls a as a function of a control signal derived from an electrical signal outputted by the EAM, the level of the CW light that is supplied by the source, e.g., a laser, optical amplifier, or a combination of those devices.

These and other aspects of our invention may be appreciated from the following detailed description and accompanying drawings.

DETAILED DESCRIPTION

Figure 1:
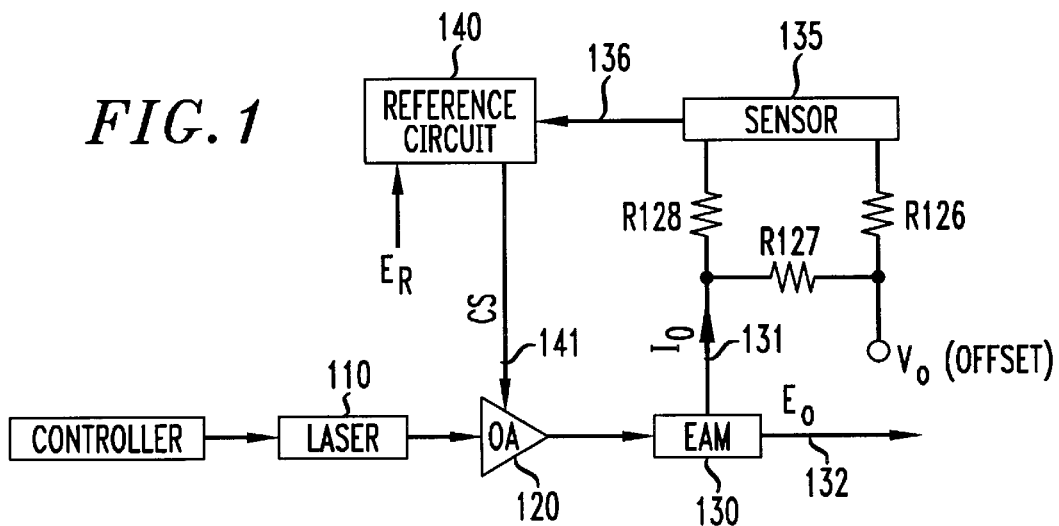
FIG. 1 is a broad block diagram of a circuit which implements the principles of the invention in a optical transmission system.

A portion of an optical signal path is shown in FIG. 1 and includes conventional laser 110 which outputs to a conventional semiconductor optical amplifier (OA) 120 CW light signals having a fixed level. The level of such light is then adjusted according to the gain of OA 120 and to the level of a Control Signal, CS, that reference circuit 140 supplies to OA 120 via control path 141. The adjusted signal is then presented to conventional Electroabsorption Modulator (EAM) 130. EAM 130, in turn, absorbs the energy associated with the light signal that it receives and outputs a corresponding optical signal, Eo, to fiber pigtail 132. EAM 130 converts a small proportion of the OA 120 output to a current, Io, and supplies the current to lead 131 connected to a sensor network. In illustrative embodiment of the invention, the sensor network includes resistors R128, R126 and R127. Resistors R128 and R126 present a high impedance path to EAM 130 so as to not adversely affect EAM 130 as well as the level of the signal outputted to lead 131. It is seen that R127 is bridged across lead 131 and a source of offset voltage, Vo. The level of a voltage ($E_{127}$) that occurs across R127 as a result of signal Io is also proportional to the level of signal Eo. Sensor 135, via resistors R125 and R126, senses the level of the voltage signal, $E_{127}$, that appears across R127 and outputs a sensed copy of that voltage level to reference circuit 140 via path 136. Reference circuit 140 compares the level of the signal that it receives via path 126 with a predetermined reference level $E_R$ and outputs a control signal, CS, indicative of the difference between $E_R$ and the signal that it receives via path 136 to control path 141. Thus, if the received signal is less (more) than $E_R$, then CS is less (more) than its nominal level. OA 120, in turn, amplifies the level of the light signal that it receives from laser 110 as a function of the level of the control signal that it receives via path 141. Thus, the path 131 through sensor 135 and reference circuit 140 and path 141 represent a feedback control arrangement which offsets the effect that OA 120 and EAM 130 may have on the correlation between the front and back facet power of laser 110 and the EAM optical output.

(It is noted that if desired other apparatus (not shown) may also be disposed between laser 110 and EAM 130.)

Figure 2:
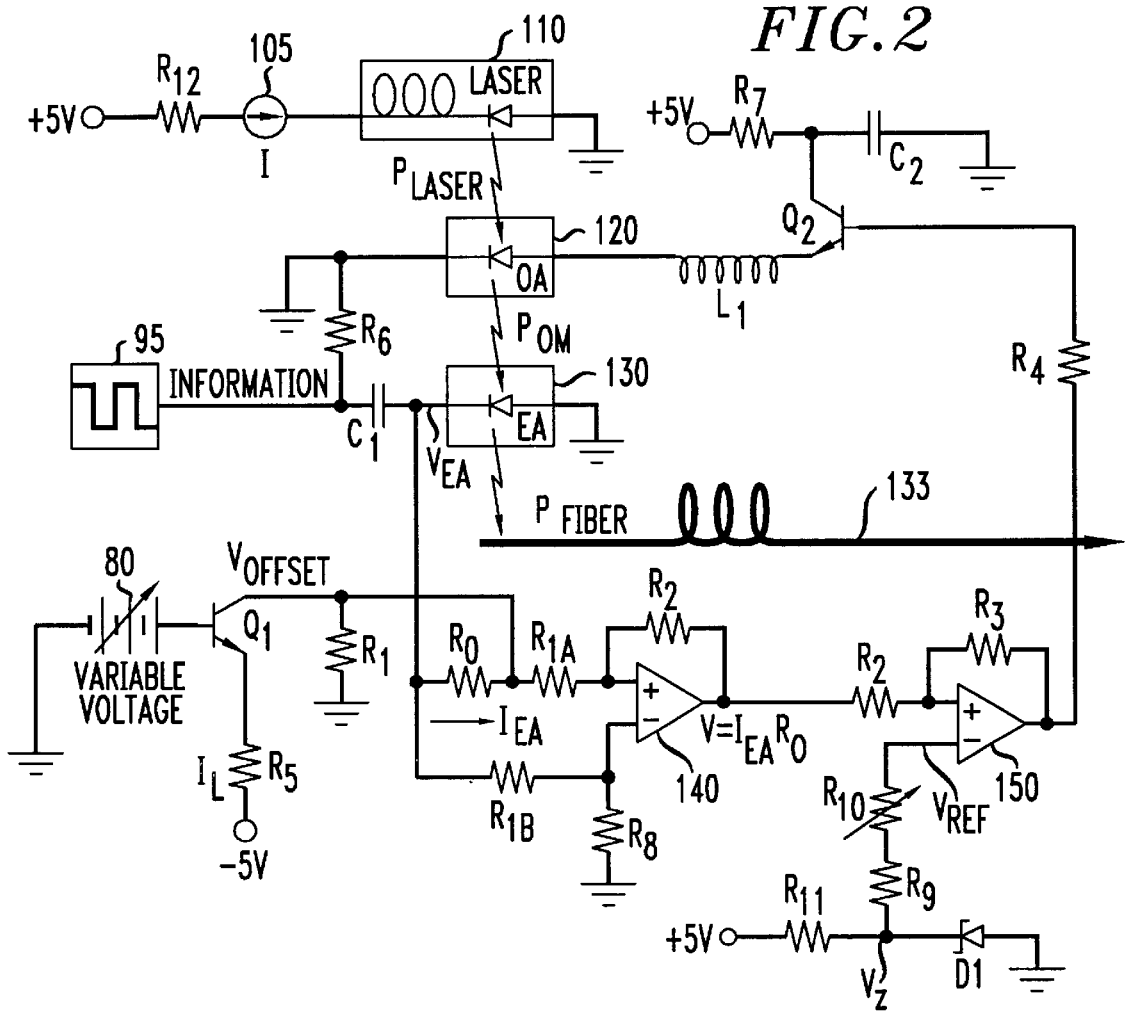
FIG. 2 is a more detailed diagram of the circuit of FIG. 1.

A more detailed version of the inventive control circuitry is illustrated in FIG. 2, in which a conventional current source 105 supplies a current to a conventional wavelength selectable laser 110. The current is based on the back-facet of laser 110 and is used to keep the value of a signal $P_{laser}$ generated by laser 110 constant. The latter signal ($P_{laser}$) is coupled to optical amplifier (OA) 120 whose gain is controlled by a control loop that senses the level of current flowing through electro-absorption (EA) modulator 130. The optical power ($P_{OA}$) generated by OA 120 is coupled to EA modulator 130, which modulates the information (data) that it receives from a source 95 and outputs the modulated result to optical fiber transmission path 133 for delivery to a particular destination. The coupled power also causes a current, $I_{EA}$, proportional to $P_{OA}$ to flow through resistor R0, which, in turn, causes a voltage drop across resistor $R_0$. In an illustrative embodiment of the invention, the circuit comprising transistor Q1, resistors R5 and R1 and variable voltage supply 80 generate an offset voltage. (Note that a voltage will not appear across resistor $R_0$, regardless of the value of $V_{offset}$, unless optical power is passing through EAM 130.) The voltage drop across $R_0$ is sensed by difference amplifier 140, which has a unity gain and which outputs a signal equal to $I_{EA}R_0$ to one terminal (input) of comparator 150. The other terminal of comparator 150 is connected to a reference voltage, $V_{REF}$, illustratively a voltage that is set by the resistor network comprising resistors R8 and R9 and variable resistor R10 and zener diode D1. In an illustrative embodiment of the invention, diode D1 has a zener voltage of 2.5 volts. Variable resistor R10 is provided so that the reference voltage may be set manually or automatically under processor control. Operational amplifier 150, in turn, outputs a signal having a level which drives via feedback resistor R3 the level of the signal supplied to its negative terminal to equal the level of the signal supplied to its positive terminal. Such output also drives the base of transistor Q2, which, based on the level of the signal that it receives from OA 120, either increases or decreases the level of the current signal that it supplies to operational amplifier 140 to guarantee that the levels of the signals respectively supplied to the negative and positive terminals of operational amplifier 150 are equal.

Thus, if the level of the signal supplied to the negative terminal of operational amplifier 150 is less than the level of the reference signal supplied to the corresponding positive terminal, then the level of the signal that operational amplifier 150 outputs increases, thereby causing Q2 to supply a larger current to optical amplifier 120, which in turn increases the level of $P_{OA}$ and thus $I_{EA}$. The opposite case holds in the event that the level of the signal supplied to the negative terminal of operational amplifier 150 is greater than the level of the reference signal. Thus, the output of operational amplifier 150, within a short period of time of becoming operational, reaches an equilibrium state at which point the level of the signal $I_{EA}R_0$ equals the level of $V_{REF}$. Moreover, such equilibrium is maintained even as the values of the various components change due to, for example, aging, temperature, etc. That is, if the level (value) of $I_{EA}R_0$ changes, then the change will be sensed by operational amplifiers 140 and 150 which will then cause the level of the signal driving optical amplifier 120 to change to maintain such equilibrium.

The following is a list of values for one illustrative embodiment of the circuit shown in FIG. 2.

$R_0 = 1$ k$\Omega$
$R_1 = 51$ $\Omega$
$R_{1A} = 51$ k$\Omega$
$R_{1B} = 51$ k$\Omega$
$R_2 = 51$ k$\Omega$
$R_3 = 51$ k$\Omega$
$R_4 = 10$ $\Omega$
$R_5 = 1$ $\Omega$
$R_6 = 50$ $\Omega$
$R_7 = 20$ $\Omega$
$R_8 = 51$ k$\Omega$
$R_9 = 100$ $\Omega$
$R_{10} = $ variable resistor
$R_{11} = 100$ $\Omega$
$R_{12} = 20$ $\Omega$
$C_1 = 0.1$ $\mu f$
$C_2 = 1.0$ $\mu f$
$L_1 = 10$ $\mu h$
$V_{offset} = -1.5$ v The foregoing is merely illustrative of the principles of the invention. Those skilled in the art will be able to devise numerous arrangements, which, although not explicitly shown or described herein, nevertheless embody those principles that are within the spirit and scope of the invention. For example, although the principles of the invention were discussed in the context of controlling optical amplifier 120, they may be equally applied to controlling the level of the signal emitted by laser 110. In this way, the level of the signal emitted by laser 110 changes until the system reaches an equilibrium state, as discussed in connection with optical amplifier 120.

We claim:

1. Apparatus for controlling the level of a signal outputted to an optical transmission line comprising, an electro-absorption modulator for receiving an optical signal originated by a source of optical signals and outputting a corresponding optical signal to the transmission line, first apparatus for generating a control signal having a level that is correlated to the level of the optical signal that is received by the electro-absorption modulator, and second apparatus for changing the level of the optical signal that is supplied to the electro-absorption modulator until the level of the control signal equals a predetermined level.

2. The apparatus of claim 1 wherein said second apparatus includes a comparator which directs the source of optical signals to increase the level of the optical signal that it supplies to the electro-absorption modulator if the comparator determines that the level of the control signal is less than the predetermined level and directs the source of optical signals to decrease the level of the optical signal that it supplies to the electro-absorption modulator if the comparator determines that the level of the control signal is greater than the predetermined level.

3. The apparatus of claim 1 wherein said source of optical signals includes a laser that generates and emits a light signal of a fixed level, an optical amplifier coupled to the laser to (a) receive the emitted light signal, (b) amplify the received light signal in accordance with a level of a signal received from the second apparatus and (c) emit the amplified light signal for reception by the electro-absorption modulator.

4. The apparatus of claim 1 wherein the source of optical signals includes an optical amplifier coupled to an originator of light signals such that the optical amplifier amplifies the light signals in accordance with a level of a signal received from the second apparatus and supplies the amplified light signals to an output.

5. The apparatus of claim 4 wherein the output of the optical amplifier includes a spaced-apart optical connection to the electro-absorption modulator.

6. The apparatus of claim 1 wherein said source of optical signals includes a laser that generates and emits a light signal that is received by the optical amplifier.

7. An optical transmission system comprising an electro-absorption modulator operative for absorbing energy from a light signal received from a source of light signals and modulating the received light with information signals received from a source of information and outputting the modulated light signal to an optical transmission line, and first apparatus for controlling the level of the light signals supplied by the source of light signals as a function of a control signal having a level proportional to the level of the absorbed energy.

8. The optical transmission system of claim 7 further comprising second apparatus that causes the source of light signals to change the level of the light signal that it supplies until the level of the control signal equals a predetermined level.

9. The optical transmission system of claim 8 wherein said second apparatus includes a comparator which directs the source of light signals to increase the level of the light signal that it supplies to the electro-absorption modulator if the comparator determines that the level of the control signal is less than the predetermined level and directs the source of light signals to decrease the level of the light signal if the comparator determines that the level of the control signal is greater than the predetermined level.

10. The optical transmission system of claim 7 wherein said source of light signals includes a laser that generates and emits a light signal of a fixed level, and an optical amplifier coupled to the laser to receive the emitted light signal, amplify the received light signal in accordance with a level of a signal received from the second apparatus and output the amplified light signal for reception by the electro-absorption modulator.

11. The optical transmission system of claim 8 wherein the source of light signals includes an optical amplifier coupled to the source of light signals such that the optical amplifier amplifies the light signals in accordance with a level of a signal received from the second apparatus and emits the amplified light signals at an output.

12. The optical transmission system of claim 8 wherein said source of light signals includes a laser that generates and emits a light signal that is received by the optical amplifier.

13. A method of offsetting the effect that an electro-absorption modulator may have on the correlation between the front and back facet power of a laser, at the electro-absorption modulator, absorbing energy from an optical signal emitted by a source of optical signals and modulating information signals onto the absorbed optical signal and outputting the modulated signal to an optical transmission line, and at optical processing apparatus, controlling, as a function of a control signal having a level proportional to the level of the absorbed energy signal, the level of the light signals emitted by the laser.

* * * * *